United States Patent [19]

Hubertson

[11] Patent Number: 4,634,097
[45] Date of Patent: Jan. 6, 1987

[54] SEALING DEVICE FOR THROTTLE VALVES

[75] Inventor: Folke H. Hubertson, Säffle, Sweden

[73] Assignee: Aktiebolaget Somas Ventiler, Saffle, Sweden

[21] Appl. No.: 759,852

[22] Filed: Jul. 29, 1985

[30] Foreign Application Priority Data

Sep. 27, 1984 [SE] Sweden .............................. 8404833

[51] Int. Cl.$^4$ ............................................. F16K 1/226
[52] U.S. Cl. .................................... 251/173; 251/306; 251/362
[58] Field of Search ............... 251/305, 306, 314, 173, 251/362, 174

[56] References Cited

U.S. PATENT DOCUMENTS

| | | | |
|---|---|---|---|
| 3,029,063 | 4/1962 | Moen | 251/306 |
| 3,080,145 | 3/1963 | Swain | 251/306 |
| 4,058,290 | 11/1977 | Nelimarkka | 251/306 |
| 4,254,937 | 3/1981 | Hubertson | 251/305 |
| 4,284,264 | 8/1981 | Hubertson | 251/305 |
| 4,294,283 | 10/1981 | Scharres | 251/305 |
| 4,372,530 | 2/1983 | Lovorsi | 251/173 |
| 4,378,104 | 3/1983 | Ben-Ur | 251/306 |

Primary Examiner—Martin P. Schwadron
Assistant Examiner—Sheri M. Novack
Attorney, Agent, or Firm—Murray and Whisenhunt

[57] ABSTRACT

The invention relates to a sealing device for such throttle valves as comprise a valve housing with a valve seat and a pivotally mounted throttle member which may be pressed against the valve seat to bring about a sealing contact between two interacting sealing surfaces, one on the throttle member and the other in the valve housing and a sealing ring to be mounted in a slot in the valve. The invention is characterized in that the sealing ring (5) has a cross-section of a homogeneous, radially elongated body part (8) of considerable rigidity and resistance to radial deformation, that said body part at its head end (11) has a sealing surface (12) which is one of the two said sealing surfaces, and that from the "hip" part of the said homogeneous body part extend two essentially radial legs (14, 15), which form flanges of the sealing ring, said flanges being arrnaged to be pressed axially against the walls (18, 19) of said slot.

1 Claim, 1 Drawing Figure

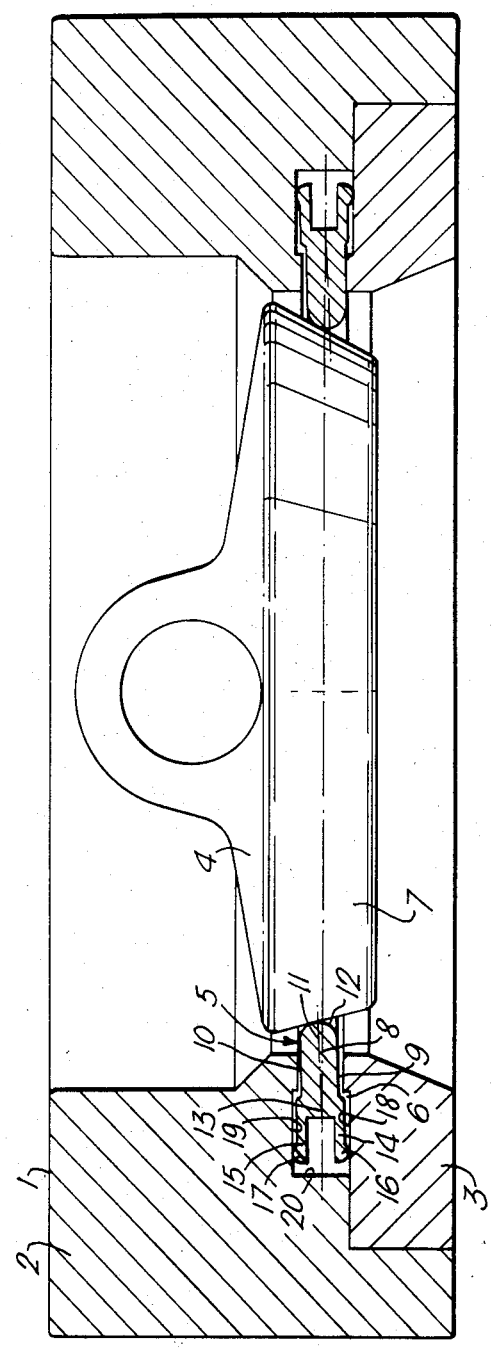

SEALING DEVICE FOR THROTTLE VALVES

TECHNICAL FIELD

The invention relates to a sealing device for such throttle valves as comprise a valve housing with a valve seat and a pivotally movable throttle member which may be pressed against the valve seat to bring about a sealing contact between two interacting sealing surfaces, one on the throttle member and the other in the valve housing and a sealing ring to be mounted in a slot in the valve.

BACKGROUND ART

A sealing device of the type referred to in the preamble is known for instance from U.S. Pat. No. 4 284 264. This known device comprises a homogeneous sealing ring intended to be mounted in a slot in the valve housing. The valve ring cross-section is an elongated flat body. The ring normally consists of metal and is considerably rigid with respect to deformation in the radial direction. The ring may, however, be bent aside by the throttle, when the throttle is pressed against the sealing ring. The inner, bluntly rounded edge of the ring constitutes the second sealing surface referred to above. A pair of spring washers are pressed against the two flat sides of the sealing ring, and between these two washers is formed the slot in which the sealing ring is mounted. The spring washers are in turn arranged between the valve housing and a mounting ring, gaskets being placed between the latter parts and the spring washers. Although this known device has several positive qualities compared to prior art and has signified a substantial improvement within this particular field, the two spring washers and the gaskets do constitute a complication.

From for instance U.S. Pat. No. 3 080 145 and U.S. Pat. No. 4 058 290 the use of sealing washers with a U-shaped section is known for throttle valves with metallic sealing. In comparison with U.S. Pat. No. 4 284 264 these have the advantage of being uncomplicated and not requiring separate gaskets. On the other hand, they have a low rigidity and resistance to radial deformation, which is unsatisfactory at least for some applications.

DISCLOSURE OF THE INVENTION

The object of the invention is to provide an improved sealing device for throttle valves of the type referred to in the preamble. In particular, an object is to eliminate the disadvantage listed above of prior art sealing devices for throttle valves.

These and other objects may be accomplished by the sealing ring having a homogeneous, radially oblong body part of considerable rigidity and resistance to radial deformation, by the homogeneous body part having at its head end a sealing surface, constituting one of the two sealing surfaces mentioned in the preamble, and by two essentially radially directed legs extending from the "hip" portion of the homogeneous body, said legs forming flange-like extensions of the sealing ring, said extensions being intended to be pressed in the axial direction against the walls of the slot.

Further advantages and characteristics of the invention will become apparent from the appended claims and the following description of a preferred embodiment.

DESCRIPTION OF A PREFERRED EMBODIMENT

In the following description reference will be made to the drawing FIGURE, which shows an axial section of a throttle valve with a sealing device according to the invention. The valve comprises a valve housing 1 with a main part and a cover ring 3; a pivotally mounted throttle 4; and a sealing ring 5 in an annular slot 6 in the valve housing between the main part 2 and the cover ring 3. The throttle 4 has a sealing surface 7, which according to this embodiment is of the same configuration as in U.S. Pat. No. 4 284 264. The sealing device according to the invention is not limited, however, to be used with this throttle configuration.

The sealing ring 5 normally consists of stainless, acid-proof steel; an alternative is a very stiff plastic material. It is also conceivable that the ring 5 consists of a composite material or is composed of several materials. The ring 5 has a section which has a "creature"-resembling configuration with an elongated body part 8. The two sides 9, 10 of the body part 8 are completely flat and parallel. At that end 7 of the ring, which is directed toward the throttle member, the body part 8 is transfigurated directly into a "head" part 11 with a bluntly rounded surface 12, which constitutes the first sealing surface of the valve, against which the sealing surface 7 of the throttle 4 may be pressed.

From the "hip" 13 of the body part 8, i.e. from the peripheral part of the homogeneous part of the ring 5, a pair of annular flanges 14, 15 extend radially, symmetrically outwards. In the section illustrated, the flanges 14 and 15 form the legs of the creature-resembling figure. On the legs 14, 15 there extend a pair of feet 16, 17, each being an outwardly pointing ledge on the respective flanges 14, 15. The feet/ledges 16, 17 are pressed by spring action of the legs/flanges 14, 15 against the walls 18 and 19, respectively, of the slot 6. The configuration of the ring 5 ensures the desired combination of radial rigidity, axial flexibility, and sealing ability against the two walls 18, 19 of the slot 6. The ring 5 by itself is stiff enough, which means that the two legs/flanges 14, 15 need not "brace their feet" 16, 17 against the bottom 20 of the slot 6. On the contrary, the slot 6 is so deep that the ring 5 may be displaced radially, i.e. the diameter of the slot 6 is greater than the outer diameter of the ring 5. The position of the ring 5 is thus adaptable to the throttle 4 when the valve is first closed. During this adaptation, the feet/ledges 16, 17 will slide against the parallel radial walls 18, 19 of the slot 6 without losing their sealing contact with them.

I claim:

1. In a throttle valve comprising a valve housing with a substantially annular valve seat, having a first sealing surface, and a throttle member having a second sealing surface, pivotally mounted in said valve housing so as to have said second sealing surface pressed into engagement with said first sealing surface when said valve is closed; said valve seat consisting essentially of a substantially annular slot, having an axis, an axial width, an inner diameter and an outer diameter, formed in said valve housing and an annular sealing ring, having an axial width, disposed within said slot, said slot having a pair of axially spaced apart side walls and a bottom wall forming the outer diameter of said annular slot, said sealing ring slidably engaging said pair of side walls; the improvement comprising: said sealing ring comprising an annular member having a substantially Y-shaped cross-section formed by a pair of radially outwardly extending, spaced apart, parallel legs conjoined by a radially inward extending head portion; each of sid legs at their free end having a flange portion extending axially away from the other of said pair of legs; said head portion having a rounded portion at its free end, said rounded portion forming said first sealing surface; said radial inward extension of said head protion being at least equal to said radial outward extension of said pair of legs; said sealing ring being formed of a resilient material to afford a head portion of considerable rigidity and resistance to radial deformation and to cause said pair of legs to spring axially outwardly against side walls; said outer diameter of said slot being greater than the outer diameter of said sealing ring as defined by the free ends of said legs and said inner diamter of said slot being greater than said inner diameter of said sealing ring as defined by the rounded portion of the head portion such that when said sealing ring is centered on the axis of said slot said free ends of said legs are radially spaced apart from said bottom wall and said rounded portion of said head portion protrudes from said slot; said axial width of said sealing ring is greater across said pair of legs than across said head portion; and said axial width of said slot is greater proximate said pair of legs of said sealing ring than proximate said head portion of said sealing ring.

* * * * *